United States Patent
McKinstry et al.

(10) Patent No.: US 7,050,272 B1
(45) Date of Patent: May 23, 2006

(54) REDUCTION OF CONTACT NOISE IN SINGLE-ENDED MAGNETORESISTIVE READ ELEMENTS

(75) Inventors: Kevin Dale McKinstry, Laporte, CO (US); Carl Stephen Arnold, Golden, CO (US); Yi Shung Chaug, Cupertino, CA (US)

(73) Assignee: Storage Technology Corporation, Louisville, CO (US)

( * ) Notice: Subject to any disclaimer, the term of this patent is extended or adjusted under 35 U.S.C. 154(b) by 394 days.

(21) Appl. No.: 10/334,545

(22) Filed: Dec. 30, 2002

(51) Int. Cl.
*G11B 5/39* (2006.01)

(52) U.S. Cl. ........................ 360/319; 360/320
(58) Field of Classification Search ................ 360/319, 360/126, 320
See application file for complete search history.

(56) References Cited

U.S. PATENT DOCUMENTS

| | | | |
|---|---|---|---|
| 5,644,455 A * | 7/1997 | Schultz | 360/320 |
| 5,809,636 A * | 9/1998 | Shouji et al. | 29/603.14 |
| 5,966,273 A * | 10/1999 | Matsumoto et al. | 360/320 |
| 6,097,578 A | 8/2000 | Pokhil | 360/319 |
| 6,147,828 A | 11/2000 | Bloodworth et al. | 360/65 |
| 6,188,549 B1 * | 2/2001 | Wiitala | 360/320 |
| 6,197,439 B1 | 3/2001 | Parkin et al. | 428/678 |
| 6,252,749 B1 * | 6/2001 | Hayakawa | 360/320 |
| 6,271,998 B1 | 8/2001 | Coehoorn et al. | 360/324.2 |
| 6,279,827 B1 | 8/2001 | Yeckley | 235/449 |
| 6,396,670 B1 * | 5/2002 | Murdock | 360/319 |
| 6,404,603 B1 * | 6/2002 | Inoue et al. | 360/320 |
| 6,751,055 B1 * | 6/2004 | Alfoqaha et al. | 360/126 |
| 6,765,768 B1 * | 7/2004 | Saito | 360/319 |
| 2002/0064005 A1 * | 5/2002 | Arasawa et al. | 360/324.12 |
| 2002/0135947 A1 * | 9/2002 | Aoki et al. | 360/322 |
| 2003/0035251 A1 * | 2/2003 | Asida et al. | 360/322 |
| 2003/0231437 A1 * | 12/2003 | Childress et al. | 360/324.12 |

* cited by examiner

*Primary Examiner*—Brian E. Miller
(74) *Attorney, Agent, or Firm*—Yee & Associates, P.C.

(57) ABSTRACT

A single-element magnetoresistive (MR) read head with reduced susceptibility to noise is disclosed. In particular, the present invention addresses the problem of noise generated thermally through contact with the recording medium. The present invention solves this problem by keeping the temperature of the read head at a level that minimizes the noise level. According to a preferred embodiment of the present invention, the shielding material used in the read head is recessed with respect to the magnetic-medium-bearing surface. In an alternative embodiment of the present invention, a thin coating of metal on the read head surface is applied. In yet another embodiment, the read element is operated with a low bias current so as to minimize the thermal effect of power consumption due to electrical resistance. In still another embodiment, the read element makes use of insulating material that is both an electrical insulator and a high quality thermal insulator.

8 Claims, 2 Drawing Sheets

REDUCTION OF CONTACT NOISE IN SINGLE-ENDED MAGNETORESISTIVE READ ELEMENTS

BACKGROUND OF THE INVENTION

1. Field of the Invention

The present invention relates to a method and apparatus for reducing noise due to head-tape contact in a single-ended magnetoresistive read element.

2. Background of the Invention

Information is written onto a magnetic tape by magnetizing tape elements. These magnetized tape elements produce a magnetic field that can be detected and converted to an electrical signal by a read head. A common type of read head for carrying out this conversion is the magnetoresistive (MR) read head.

A simple MR head consists of a thin film of magnetoresistive material, such as permalloy, between two insulating layers. When the MR layer is formed, a magnetic field is typically applied in a direction parallel to the plane of the thin layer. Thus, the MR layer exhibits a uniaxial anisotropy with an easy-axis of magnetization parallel to the direction of the applied field. If an external magnetic field, such as from a magnetic tape, is applied normal to the easy-axis, the magnetization direction of the MR layer will rotate away from the easy-axis and toward the direction of the applied magnetic field. This magnetization rotation causes a change in resistance in the MR layer. When no external field is applied, the resistance is greatest. The resistance decreases with increasing applied field. For practical geometries of the MR layer, resistance as a function of applied field traces a bell-shaped curve. The MR head is often biased with an applied current such that a zero magnitude applied field results in a resistance near an inflection point on the resistance curve. Thus, small changes about a zero magnitude applied external field result in nearly linear changes in resistance.

To accommodate increasing densities of data stored on magnetic tape, the geometries of read heads continue to shrink. As read head geometries become smaller, however, MR read heads become increasingly susceptible to noise. Dual-element read heads may be used in a differential manner to counteract some of this susceptibility by eliminating common-mode noise, but at a cost of slightly increased head size and loss of data density on the recording medium. A need exists, therefore, for a read head that allows for a smaller physical size than conventional double-element read heads, but with less susceptibility to noise.

SUMMARY OF THE INVENTION

The present invention is directed toward a single-element magnetoresistive (MR) read head with reduced susceptibility to noise. In particular, the present invention addresses the problem of noise generated thermally through contact with the recording medium. The present invention solves this problem by keeping the temperature of the read head at a level that minimizes the noise level. According to a preferred embodiment of the present invention, the shielding material used in the read head is recessed with respect to the magnetic-medium-bearing surface. In an alternative embodiment of the present invention, a thin coating of metal on the read head surface is applied. In yet another embodiment, the read element is operated with a low bias current so as to minimize the thermal effect of power consumption due to electrical resistance. In still another embodiment, the read element makes use of insulating material that is both an electrical insulator and a high quality thermal insulator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
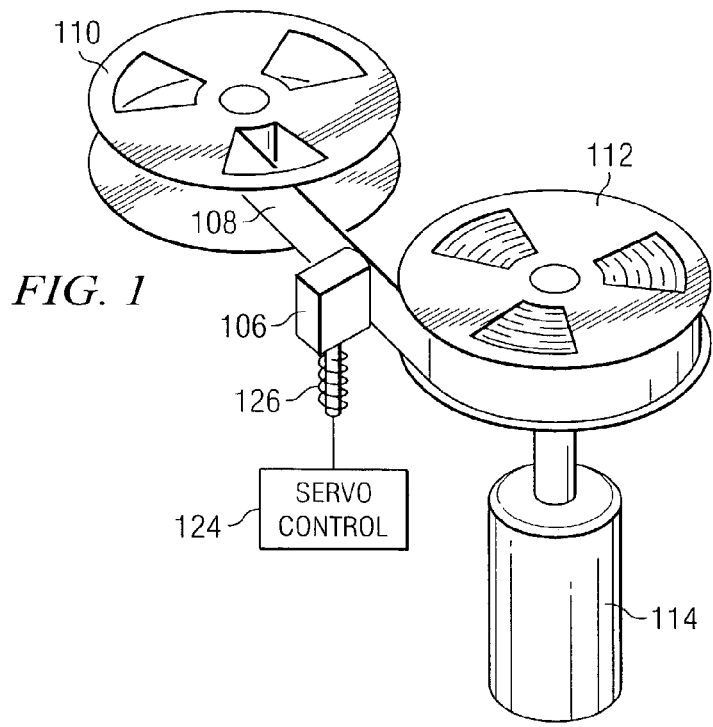
FIG. 1 is a diagram depicting the main components of a magnetic tape drive in which the teachings of the present invention may be applied.

The present invention is directed generally toward a magnetoresistive (MR) read element for reading information from a magnetic storage medium in a storage device. FIG. 1 depicts the primary components of a magnetic tape drive, which is one type of storage device in which the present invention may be implemented.

Magnetic tape 108 moves from source spool 110 to take-up spool 112 in a pulley action from force applied by motor 114. Source spool 110 and take-up spool 112 may exist separately, or may be incorporated into an integrated package, such as a tape cartridge or cassette.

Data recorded to magnetic tape 108 will preferably be written in the form of several parallel tracks extending longitudinally along a surface of magnetic tape 108. Read/write assembly 106 will preferably contain multiple read heads and write heads for reading and writing to/from these tracks simultaneously. Read/write assembly 106 maintains alignment with magnetic tape 108 by way of a servo control 124, which uses solenoid 126 to position read/write assembly 106 vertically with respect to magnetic tape 108. Read/write assembly 106 is generally positioned so that its read and write heads are kept at a very small distance from magnetic tape 108 in order to detect the small magnetic flux reversals on magnetic tape 108 that encode digital data or other information (e.g. analog signals or audio).

Because read/write assembly 106 is positioned at only a small distance from magnetic tape 108, which is a moving medium, intermittently the read/write assembly 106 and the read and write elements it contains will make contact with magnetic tape 108. This intermittent contact with magnetic tape 108 causes the temperature of the read and write elements in read/write assembly 106 to fluctuate. When the read elements are very small in size, this contact with magnetic tape 108 can result in a significant amount of thermally-generated noise being injected into the signal read from magnetic tape 108.

One of ordinary skill in the art will recognize that this thermally-generated noise resulting from contact with the recording medium (hereinafter referred to as "thermal contact noise") is not a phenomenon limited to magnetic tapes, but may also occur in other magnetic media without limitation. Examples of other magnetic media include floppy disks, hard disks, and magnetic drums.

Figure 2:
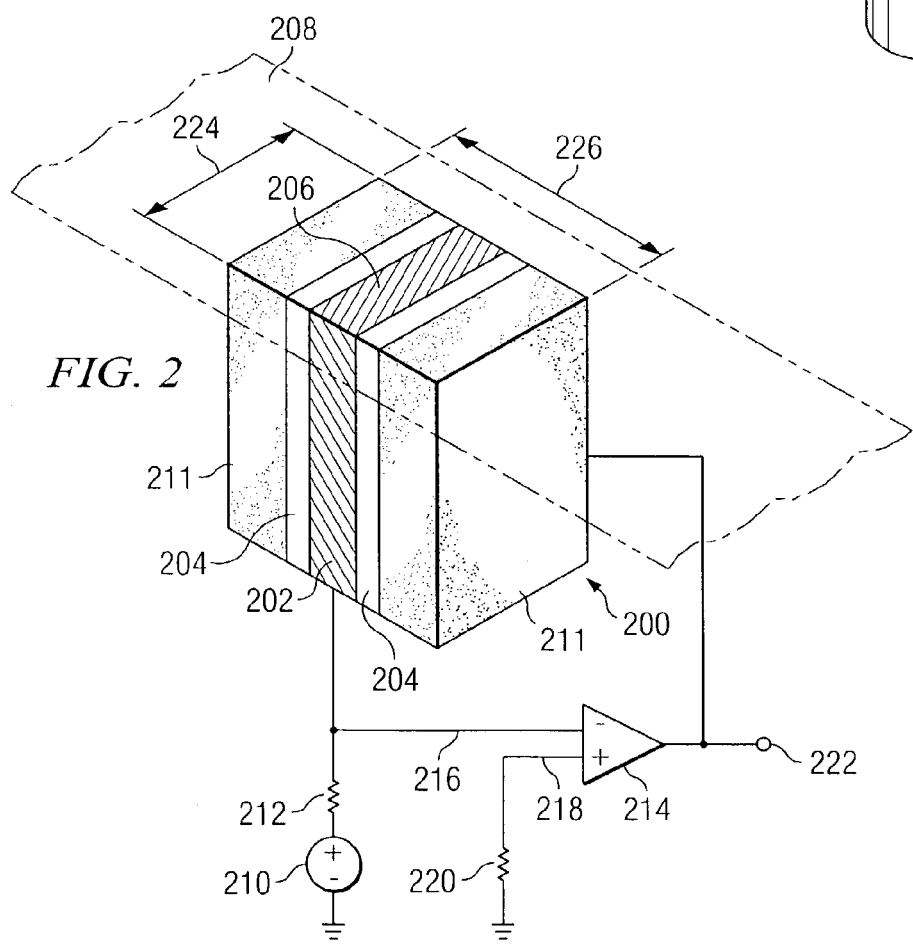
FIG. 2 is a diagram of a magnetoresistive read element and associated read circuitry as may be incorporated into a preferred embodiment of the present invention.

FIG. 2 is a diagram depicting a single-element magnetoresistive (MR) read element 200 as may be incorporated into a preferred embodiment of the present invention. MR read element 200 comprises a layer of magnetoresistive material 202, such as permalloy, sandwiched between two layers of an electrically insulating material 204 to form a generally rectangular block, which is in turn sandwiched between two layers of magnetic shielding material (shields) 211. One side of MR read element 200 that contains an exposed portion of magnetoresistive material 202 is designated as an active side 206 of MR read element 200 and is the side of MR read element 200 that faces recording medium 208.

In the presence of a magnetic field, such as that provided by recording medium 208, magnetoresistive material 202 changes in electrical resistance. Thus, magnetoresistive material 202 acts as a variable resistor or rheostat that varies in resistance in response to changes in the local magnetic field. Thus, a signal may be read from recording medium 208 via MR read element 200 by incorporating magnetoresistive material 202 into a circuit to fulfill the role of a rheostat. In FIG. 2, magnetoresistive material 202 is used as a variable feedback resistor in an operational amplifier (op-amp) circuit operating in an inverting configuration. A voltage source 210 is connected through a fixed resistor 212 to inverting input 216 of an op-amp 214, while non-inverting input 218 of op-amp 214 is grounded (optionally through a resistor 220, as shown). Magnetoresistive material 202 is connected in a feedback path from output 222 of op-amp 214 to inverting input 216 of op-amp 214. This arrangement allows a bias current to flow through magnetoresistive material 202 and allows the resistance of magnetoresistive material to control the gain of the resulting inverting amplifier circuit provided by op-amp 214. Thus, a magnetic signal recorded on recording medium 208 in converted by the resulting variable-gain amplifier circuit into a corresponding voltage level at output 222.

Returning attention now to the physical characteristics of MR read element 200, it can be seen from FIG. 2 that active side 206 of MR read element 200 forms a rectangle in two dimensions. The width of each constituent component in the MR read element sandwich is the "element width" of MR read element 200 (dimension 224). The length of the entire MR read element 200 across the sandwich layers is called the "total shield distance" of MR read element 200 (dimension 226). It can be shown experimentally that thermal contact noise in an MR read element such as MR read element 200 becomes significant when element width 224 is equal to or less than total shield distance 226, the element's operating temperature is substantially higher than the ambient temperature, and when the thermal conduction from the MR element to the media is too high.

Thermal contact noise can be reduced by minimizing the temperature change of the read element by tape contact. The tape cools the element by the following process: First, the tape transfers heat from the shields, cooling them. Then, since the shields are in thermal equilibrium with the element the element will cool also.

We can therefore minimize element temperature changes by either minimizing heat flow between the shields and tape, or providing a means to make the heat flow more constant.

Minimizing heat flow between shields and tape can be done by
A) Keeping the element temperature close to the tape temperature, thereby not heating the shields with the element and thus lowering the temperature differential between shields and tape. We accomplish this by either maintaining a bias current below a pre-determined amount, or lowering resistance below a pre-determined amount, or both.
B) Thermally isolating the element from the shields, thereby not heating the shields with the element and thus lowering the temperature differential between shields and tape. We accomplish this by either using a high-quality thermal insulator for the insulating material 204, or by increasing the thickness of this material, or both.

Making the heat flow between shields and tape more constant can by done by
A) Enhancing thermal contact between tape and shields with a coating on the head surface, thereby keeping heat transfer between shields and tape more constant and less susceptible to intermittent, discrete cooling events. This is depicted in FIG. 4.
B) Reducing thermal contact between the tape and shields by recessing the shields from the tape bearing surface, thereby minimizing heat transfer between the shields and tape. This is depicted in FIG. 3.

Figure 3:
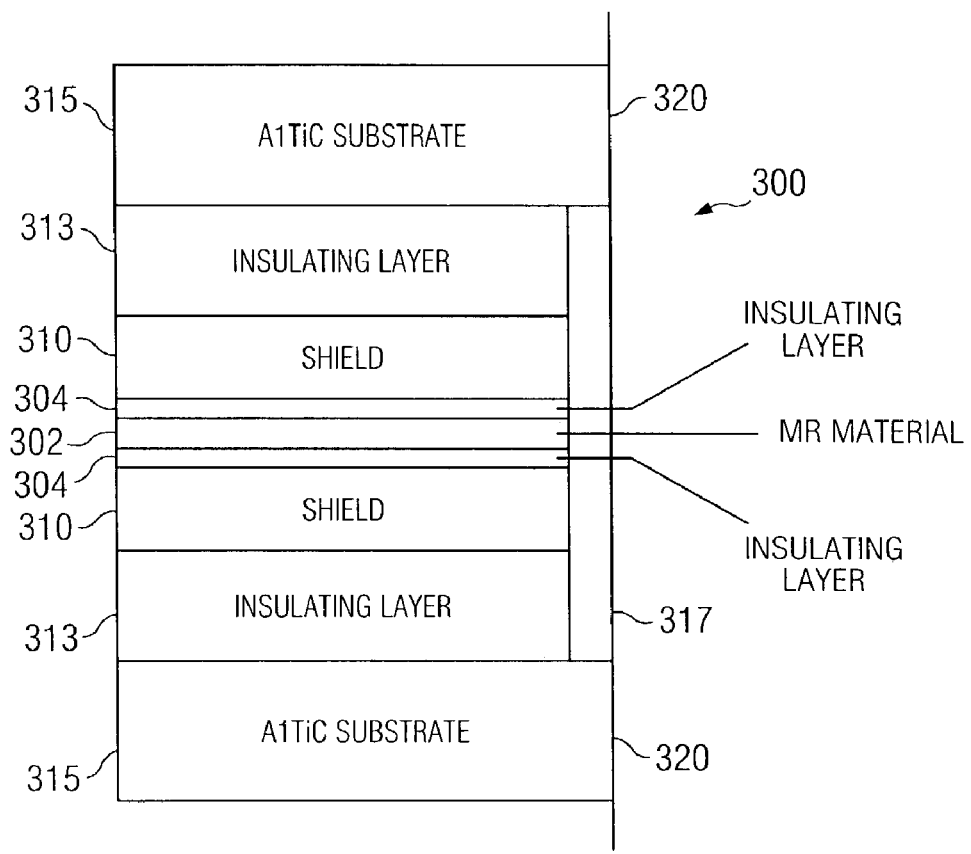
FIG. 3 is a diagram of a magnetoresistive read element in which the shielding material is recessed with respect to the active surface of the read element in accordance with a preferred embodiment of the present invention.
Figure 4:
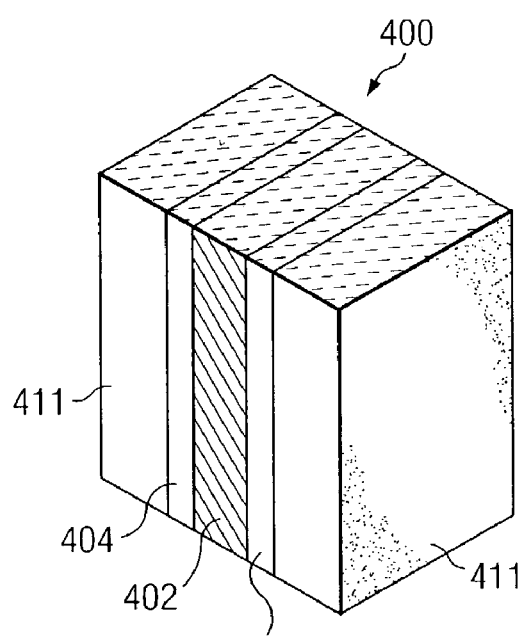
FIG. 4 is a diagram of a magnetoresistive read element with thin metal layer in accordance with a preferred embodiment of the present invention.

FIG. 3 is a diagram of an MR read element 300 in accordance with a preferred embodiment of the present invention. MR read element 300 contains magnetoresistive material 302 surrounded by shields 310, separated from magnetoresistive material 302 by layers of insulating material 304. Shields 310 are then enclosed by closure layers 315, which are separated from shields 310 by insulating layers 313. Closure layers 315 are, in a preferred embodiment, made from an alloy such as an aluminum-titanium-carbon (AlTiC) alloy, both other materials may be substituted without departing from the scope and spirit of the present invention. Closure layers 315 have medium-bearing surfaces 320 that make contact with magnetic medium 317 (e.g., magnetic tape or disk). Shields 310 (as well as magnetoresistive material 302 and insulating layers 304 and 313 in this example) are recessed from the plane of tape bearing surfaces 320. This configuration avoids heat transfer between shields 310 and magnetic medium 317, and thus reduces thermal contact noise.

FIG. 4 is a diagram depicting an alternative embodiment of an MR read element 400 in accordance with a preferred embodiment of the present invention. MR read element 400, in addition to having a layer of magnetoresistive material 402, layers of insulative material 404, and layers of shielding material 411, also has a thin layer of metal applied to the active side of MR read element 400. The metal layer allows for more even cooling of MR read element 400 and helps to stabilize the temperature of MR read element 400 to avoid noise. The metal layer in one particular embodiment consists of a 10 Angstrom layer of gold. The alternative embodiment of the present invention depicted in FIG. 4 is particularly useful in single-use or limited-use magnetic reading devices, where erosion of the metal layer over time is not a problem.

As stated previously, additional alternative embodiments of the present invention reduce thermal contact noise by lowering a bias current of the magnetoresistive material or steady state resistance of the magnetoresistive material to beneath a pre-determined amount. This prevents heating of the shields by the magnetoresistive material by keeping the current density of the magnetoresistive material low and thus lowers the temperature differential between the shields and magnetic medium (e.g., tape). This can also be accomplished by using a high-quality insulating material and/or increasing the thickness of the insulating material to prevent the magnetoresistive material portion of the MR read element from heating the shields.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic read element comprising:
    a layer of magnetoresistive material having a first side, a second side, and an active side;
    a first layer of insulating material in contact with the first side of the layer of magnetoresistive material, wherein the first layer of insulating material is a thermal insulator;
    a second layer of insulating material in contact with the second side of the layer of magnetoresistive material, wherein the second layer of insulating material is a thermal insulator;
    a first layer of shielding material in contact with the first layer of insulating material;
    a second layer of shielding material in contact with the second layer of insulating material; and
    said magnetic read element having an active side that includes the active side of said magnetoresistive material, and further comprises a substantially planar surface disposed to face a recording medium in closely spaced relationship, said active side of said magnetic read element having two orthogonal dimensions comprising a total shield distance and an element width, respectively, wherein the element width is no greater than the total shield distance.

2. The magnetic read element of claim 1, wherein:
    each of said first and second layers of insulating material is both an electrical insulator and a thermal insulator.

3. The magnetic read element of claim 1, wherein:
    said magnetic read element includes at least one closure layer having a medium bearing surface, and the first layer of shielding material and the second layer of shielding material are recessed from a plane defined by the medium bearing surface.

4. The magnetic read element of claim 3, wherein:
    the first layer of shielding material and the second layer of shielding material are recessed by a distance sufficient to inhibit heat transfer between the first layer of shielding material and a magnetic medium and inhibit heat transfer between the second layer of shielding material and the magnetic medium, such that a temperature of the first layer of shielding material and a temperature of the second layer of shielding material fluctuate within a predetermined range.

5. The magnetic read element of claim 4, wherein:
    the at least one closure layer is separated from at least one of the first layer of shielding material and the second layer of shielding material by insulating material.

6. The magnetic read element of claim 1, wherein:
    a thermally conductive material is placed in thermal contact with the active side of the magnetoresistive material.

7. The magnetic read element of claim 6, wherein:
    the thermally conductive material is a metal.

8. The magnetic read element of claim 7, wherein:
    the metal is gold.

* * * * *